Patented Aug. 2, 1938

2,125,625

UNITED STATES PATENT OFFICE 2,125,625

AZO DYESTUFFS

Detlef Delfs and Otto Bayer, Leverkusen-I. G.-Werk, Germany, assignors to General Aniline Works, Inc., New York, N. Y., a corporation of Delaware No Drawing. Application October 16, 1937, Serial No. 169,519. In Germany October 28, 1936

4 Claims. (Cl. 260—83)

The present invention relates to new azodyestuffs and to the method of preparing the same, more particularly it relates to new blue substantive azodyestuffs.

According to the present invention these new blue substantive azodyestuffs are obtained by coupling diazomonoazo-dyestuffs of the constitution:

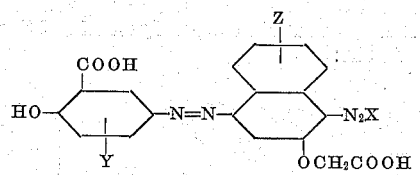

in which formula Y stands for hydrogen, methyl or chlorine, Z means hydrogen or the —SO$_3$H group and is attached to one of the β-positions, and X means the radical of an inorganic or an organic acid, with 2-amino-5-hydroxy-naphthalene-7-sulfonic acid or the N-alkyl or N-aryl derivatives thereof.

The diazomonoazodyestuffs of the above mentioned constitution are obtained by coupling a diazotized 4 - amino - 1 - hydroxybenzene-2-carboxylic acid with a 1-amino-2-carboxy-methoxynaphthalene which may be substituted in the 6- or 7-position by a SO$_3$H group the coupling taking place in the 4-position, and diazotizing the aminoazodyestuff thus obtained.

As N-alkyl and N-aryl derivatives of the 2-amino-5-hydroxynaphthalene - 7 - sulfonic acid suitable for the present invention may be mentioned 2-n-butylamino-5-hydroxynaphthalene-7-sulfonic acid, 2-diethylamino-5-hydroxynaphthalene-7-sulfonic acid, 2-phenylamino-5-hydroxynaphthalene-7-sulfonic acid, 2-p-tolylamino-5-hydroxynaphthalene-7-sulfonic acid, 2-p-anisylamino-5-hydroxynaphthalene-7-sulfonic acid, 2-(4'-hydroxy-3'-carboxy - phenylamino) - 5 - hydroxynaphthalene-7-sulfonic acid, 2-(diphenyl-(4)-amino) - 5 - hydroxynaphthalene-7-sulfonic acid, 2-(4'-benzoylamido - phenylamino) - 5 -hydroxynaphthalene-7-sulfonic acid, 5,5'-dihydroxy-2,2'-dinaphthylamine-7,7'-disulfonic acid.

The new dyestuffs obtainable according to the present invention represent dark powders which are soluble in water with a clear blue coloration. They dye materials of cellulose and regenerated cellulose clear blue shades. The dyeings can be aftertreated with agents yielding copper. The shades are only scarcely changed by this aftertreatment, but they become faster to light and washing by it.

The invention is illustrated by the following examples without being restricted thereto.

Example 1

450 parts by weight of the monoazodyestuff prepared from diazotized p-aminosalicylic acid and 1-amino-2-carboxy-methoxynaphthalene-6-sulfonic acid are dissolved in 30,000 parts by weight of water at 15° C. by the addition of a small quantity of sodium carbonate. Thereto is added a solution prepared from 75 parts by weight of sodium nitrite in 200 parts by weight of water, and, by the addition of 420 parts by weight of hydrochloric acid of 20° Bé. mixed with 800 parts by weight of ice, diazotization is caused to commence. After stirring for several hours at 10–15° C. the light yellowish-brown diazo compound is formed. The suspension of the diazo compound is now cooled to 0–5° C. and poured into the solution prepared from 330 parts by weight of 2-phenylamino-5-naphthol-7-sulfonic acid and 700 parts by weight of ice water and 3500 parts by weight of pyridine. After a short time coupling is complete.

The dyestuff formed is in its dry form a dark powder which easily dissolves in water. It has in the free state the following formula:

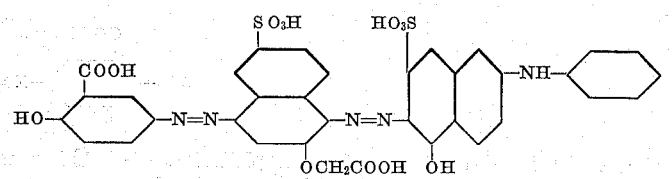

and dyes cotton and regenerated cellulose from the Glauber's salt-soda-bath clear greenish-blue shades. By aftertreatment with copper salts there is obtained a dyeing of good fastness to light and washing.

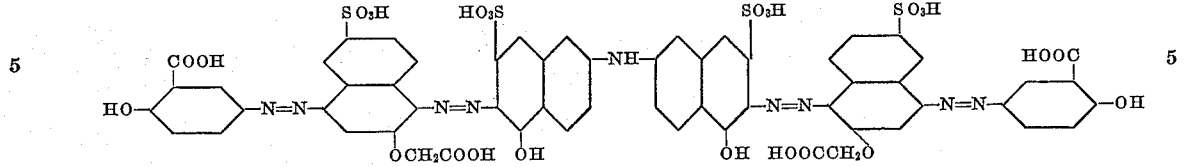

If in this example the p-aminosalicylic acid is replaced by 4-amino-6-methyl-1-hydroxybenzene-2-carboxylic acid or by 4-amino-6-chloro-1-hydroxybenzene-2-carboxylic acid, dyestuffs are obtained which practically do not differ from the dyestuff described above. Instead of the 1-amino-2-carboxy-methoxynaphthalene-6-sulfonic acid used as second component, also the 1-amino-2-carboxy-methoxynaphthalene-7-sulfonic acid can be employed.

Example 2

If as coupling component, instead of the 2-phenylamino-5-hydroxynaphthalene-7-sulfonic acid employed in Example 1, equimolar parts of 2-amino-5-hydroxynaphthalene-7-sulfonic acid, or 2-p-tolylamino-5-naphthol-7-sulfonic acid, or 2-p-anisylamino-5-naphthol-7-sulfonic acid, or 2-(4'-hydroxy-3'-carboxyphenylamino)-5-naphthol-7-sulfonic acid, or 2-(diphenyl-4-amino)-5-naphthol-7-sulfonic acid, or 2-(4'-benzoylamino-phenylamino)-5-naphthol-7-sulfonic acid are used and one otherwise proceeds in the same way as stated in Example 1, dyestuffs of similar properties are obtained.

Example 3

The aminoazo dyestuff prepared from diazotized p-amino-salicylic acid and 1-amino-2-carboxymethoxynaphthalene is diazotized and the diazo compound is, in an analogous manner to the process described in Example 1, coupled with 2-p-anisyl-amino-5-naphthol-7-sulfonic acid. A dyestuff is obtained which has in the free state the following formula:

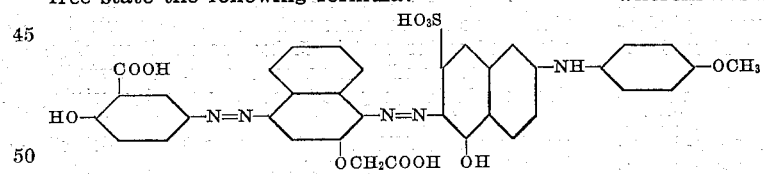

and dyes the cellulose fiber clear blue shades. The fastness to washing and light of the dyeings is remarkably increased by aftertreatment with copper salts.

Instead of the 2-p-anisylamino-5-naphthol-7-sulfonic acid there can be used J-acid itself or other N-alkyl— or arylderivatives of J-acid. Thereby dyestuffs are obtained of similar properties and shades.

Example 4

460 parts by weight of the monoazo dyestuff prepared from diazotized p-aminosalicylic acid and 1-amino-2-carboxymethoxynaphthalene-6-sulfonic acid are diazotized, and, as indicated in Example 1, coupled with 200 parts by weight of 5,5'-dihydroxy-2,2'-dinaphthylamine-7,7'-disulfonic acid.

A dyestuff is thus obtained which has in the free state the following formula:

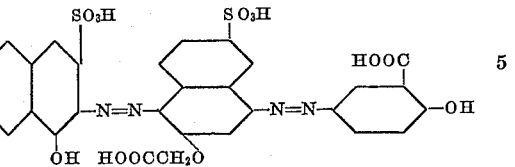

and dyes cotton clear blue shades.

We claim:
1. As new products the azodyestuffs of the general formula:

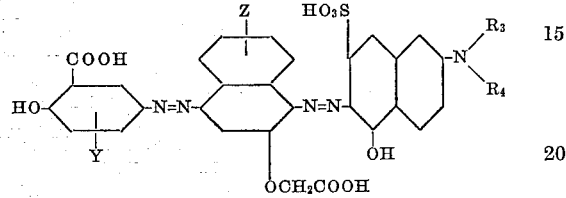

wherein Y is a substituent selected from the group consisting of hydrogen, methyl and chlorine, Z is a substituent selected from the group consisting of hydrogen and the sulfonic acid radical and is attached to one of the β-positions, and $R_3$ and $R_4$ stand for radicals selected from the group consisting of hydrogen, alkyl and aryl radicals, being soluble in water and dyeing materials of cellulose or regenerated cellulose blue shades which by aftertreatment with agents yielding copper yield similar shades of improved fastness to light and washing.

2. As new products the azodyestuffs of the general formula:

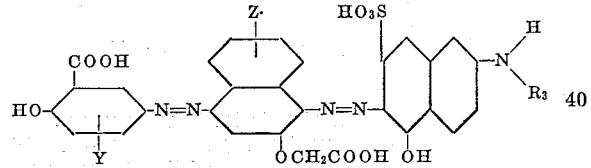

wherein Y is a substituent selected from the group consisting of hydrogen, methyl and chlorine, Z is a substituent selected from the group consisting of hydrogen and the sulfonic acid radical and is attached to one of the β-positions, and $R_3$ stands for a radical selected from the group consisting of radicals of the benzene and naphthalene series, dyeing materials of cellulose or regenerated cellulose blue shades which by aftertreatment with agents yielding copper yield similar shades of improved fastness to light and washing.

3. As new product the azodyestuff of the formula:

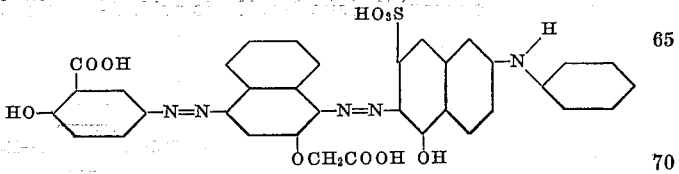

being easily soluble in water and dyeing cotton or regenerated cellulose clear blue shades which by aftertreatment with agents yielding copper yields similar shades of improved fastness to light and washing.

4. As new product the azodyestuff of the formula:
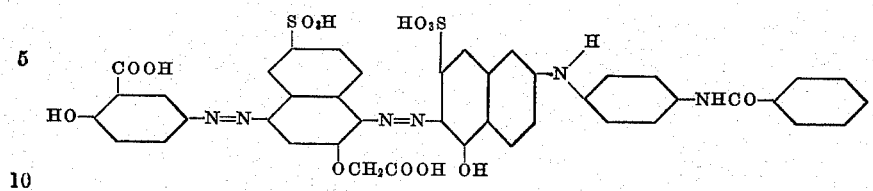
being easily soluble in water and dyeing cotton or regenerated cellulose clear blue shades which by aftertreatment with agents yielding copper yields similar shades of improved fastness to light and washing.
DETLEF DELFS.
OTTO BAYER.